United States Patent [19]
Hanson et al.

[11] Patent Number: 5,702,118
[45] Date of Patent: Dec. 30, 1997

[54] STEP BUMPER HITCH WITH INTEGRAL RECEIVER BOX

[75] Inventors: Marvin L. Hanson, Vandalia, Mich.; Richard McCoy, Granger, Ind.; Jon L. Krager, Cassopolis, Mich.

[73] Assignee: Reese Products, Inc., Elkhart, Ind.

[21] Appl. No.: 528,387

[22] Filed: Sep. 13, 1995

[51] Int. Cl.⁶ ....................................... B60D 1/07
[52] U.S. Cl. ........................ 280/491.5; 280/416.1; 280/511
[58] Field of Search ............................ 280/504, 505, 280/511, 491.1, 491.5, 415.1, 416.1

[56]  References Cited

U.S. PATENT DOCUMENTS

| | | | |
|---|---|---|---|
| 4,301,953 | 11/1981 | Abbott | 280/511 X |
| 4,662,647 | 5/1987 | Calvert | 280/491.5 X |
| 4,773,668 | 9/1988 | Muonro | 280/511 X |
| 4,863,185 | 9/1989 | Coppe | 280/511 X |
| 4,974,866 | 12/1990 | Morgan | 280/477 |

OTHER PUBLICATIONS

Quality S. Hitch Manufacturing Sales Catalog; Feb. 1994; 16.

Hidden Hitch of America Inc. Caralogue; 1993; 15.

Eaz-Lift Spring Corporation Product Catalog; 1993; 10.

Valley Industries Towing Products and Accessories Product Catalog; 1995; 17.

Putman Hitch Products, USA Product Catalog; Date Unknown; 7.

Shelton, Industries Product Catalog; 1993; 17.

*Primary Examiner*—Kevin Hurley
*Attorney, Agent, or Firm*—King & Schickli

[57]  ABSTRACT

A hitch is provided that is adapted for mounting to a step bumper. The hitch has a body including a mounting skirt, a hitch ball support platform and a facing that joins the mounting skirt and platform. The hitch also includes two laterally spaced reinforcing elements that function with the mounting skirt and define a receiver box. The hitch also includes structures allowing the mounting of a hitch ball to the hitch ball support platform or to the standard step bumper mounting point thereby providing hitch ball height adjustability.

24 Claims, 2 Drawing Sheets

STEP BUMPER HITCH WITH INTEGRAL RECEIVER BOX

TECHNICAL FIELD

The present invention relates generally to the towing field and, more particularly, to a hitch adapted for mounting on the step bumper of a vehicle in order to provide enhanced towing versatility and performance at a minimal cost.

BACKGROUND OF THE INVENTION

It has long been known to provide certain utilities vehicles such as pickup trucks with a step bumper adapted to receive a hitch ball in order to allow towing of recreational equipment such as campers and construction equipment such as air compressors. This is one approach manufacturers have found to increase the versatility of their utility vehicles in a cost effective manner that has been readily received and appreciated by the consuming public.

While the step bumper feature provides a means for ready towing, it still suffers from certain drawbacks. Specifically, since the hitch ball is directly mounted to the bumper the hitch ball is not height adjustable. As a result, the step bumper hitch ball may not be located at the proper height to allow towing of certain equipment. Additionally, no receiver box is provided and, accordingly, there is no capability of receiving a draw bar equipped with a hitch ball of either adjustable or set height. Further, many draw bars now carry convenient attachments that may be readily inserted into a receiver box and conveniently utilized by the vehicle operator. Such attachments include cargo boxes, cranes, utility racks, bike racks and even basketball goals. Of course, such draw bar mounted attachments may not be utilized with the standard step bumper which incorporates only a hitch ball and no receiver box.

In the past, if one desired to add a receiver box to a utility vehicle it was necessary to purchase and install a complete hitch receiver. Such a hitch receiver is well known in the art and generally includes a receiver box mounted at the centerline of a cross member which is secured at each distal end to a side mounting bracket. The side mounting brackets are secured to the frame of the vehicle by nut and bolt fasteners or other appropriate means. While providing full function, such a hitch receiver generally requires professional installation which often is inconvenient for the vehicle operator to obtain. Further, such a hitch receiver may require a greater capital expense than many consumers are readily willing to make for the advantages it provides. A need is therefore identified for a means of more economically adapting a vehicle equipped with a step bumper to include the advantages of draw bar compatibility provided by a receiver box.

SUMMARY OF THE INVENTION

Accordingly, it is a primary object of the present invention to provide a hitch of relatively simple and inexpensive construction incorporating an integral receiver box that is specifically adapted for direct mounting to the step bumper of a vehicle and overcomes the limitations and disadvantages of the prior art.

Another object of the present invention is to provide a relatively light weight step bumper hitch that may be easily installed on the step bumper of a vehicle in a relatively simple and expensive manner.

An additional object of the present invention is to provide a step bumper hitch that is specifically adapted to receive a draw bar or hitch bar so as to enhance towing versatility by allowing hitch ball height adjustment as well as the ready connection of draw bar mounted towing attachments including, but not limited to, bike racks, cranes, utility racks and cargo boxes of various designs.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved light weight hitch is provided that is characterized by its simple and inexpensive construction and small size. The hitch is specifically adapted for mounting to the step bumper of a vehicle although it is conceivable that it could be mounted in some other way such as direct to a vehicle frame. The step bumper hitch includes a body having a means for receiving a draw bar and a means for directly supporting a hitch ball. Thus, the step bumper hitch provides almost unlimited versatility and a larger number of towing options far outstripping a simple mounting of the hitch ball to a standard step bumper. The hitch also includes a means for mounting the body thereof to the step bumper of a vehicle. In addition, the hitch includes a means for securing the draw bar in the body when the draw bar is utilized with the step bumper hitch.

More specifically describing the invention the body includes a mounting skirt, a hitch ball support platform and a facing that joins the mounting skirt and hitch ball support platform. Preferably, the body is formed of steel or other appropriate high strength material as a single piece, integral construction.

The means for receiving a draw bar includes first and second laterally spaced reinforcing elements. These elements are connected to the mounting skirt and the facing so as to define a receiver box between the underside of the mounting skirt and the opposed inwardly directed walls of the reinforcing elements. Additionally, an aperture is provided in the facing for receiving a draw bar or hitch bar and communicating with the receiver box.

The means for securing the draw bar preferably includes a pair of aligned apertures, one on each of the first and second reinforcing elements. Additionally, the securing means includes a connecting pin for extending through the aligned apertures in the first and second reinforcing elements and a cooperating aperture in the draw bar once the draw bar is properly positioned within the receiver box. A pin clip may then be utilized to engage and secure the connecting pin in position in a manner known in the art.

So as to provide further structural rigidity to the hitch, the body may also include a reinforcing plate that is connected between the first and second reinforcing elements and the hitch ball support platform. Thus, the reinforcing plate effectively forms a rigid and strong bottom wall of the hitch.

The means for mounting the body to the vehicle preferably includes spaced mounting apertures in the mounting skirt and fastening means, such as bolts which may be extended through the spaced mounting apertures and cooperating aligned mounting holes in the step bumper. The bolts may be secured by means of cooperating nuts which are tightened down and held secure by lock washers.

In accordance with a further aspect of the present invention, a hitch ball may, of course, be mounted to the hitch ball support plate. Alternatively, the hitch includes a hitch ball mounting aperture in the mounting skirt which is aligned with the standard hitch ball mounting aperture provided in the step bumper. Accordingly, the hitch ball may also be mounted in the standard step bumper position. Thus, it should be appreciated that the hitch ball may be readily mounted at either of two vertical heights from the ground. Additionally, a height adjustable draw bar or hitch bar may be connected to the receiver box if further height adjustability is desired. Thus, it should be appreciated that the present step bumper hitch provides a range of height adjustment so that the towing of substantially any vehicle is possible. Further, as noted above, draw bar attachments may be readily connected to the step bumper hitch thereby enhancing the versatility and performance of the utility vehicle to the immense satisfaction of the operator.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
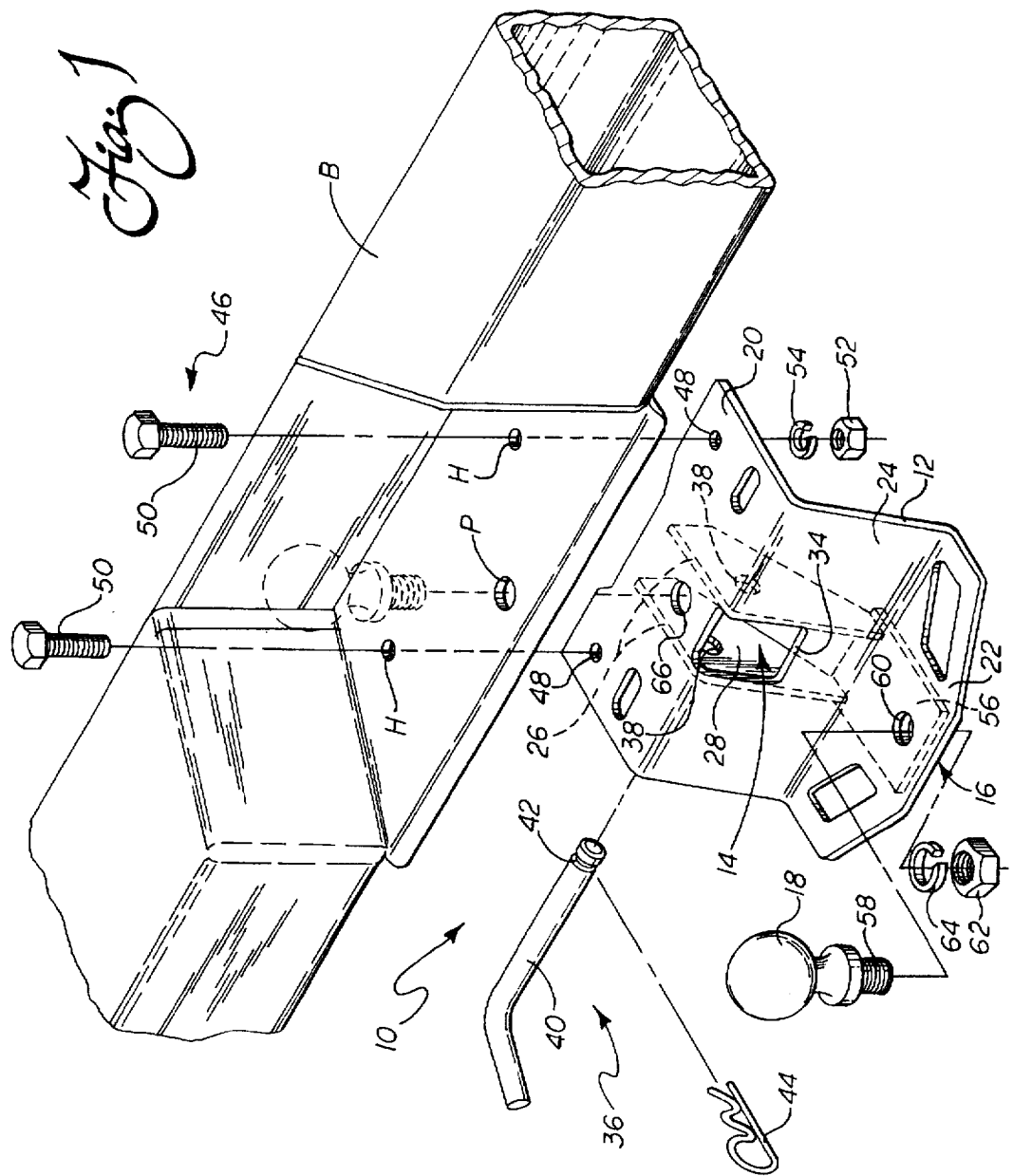
FIG. 1 is an exploded perspective view showing the step bumper hitch of the present invention and illustrating the mounting of the hitch to a step bumper.
Figure 2:
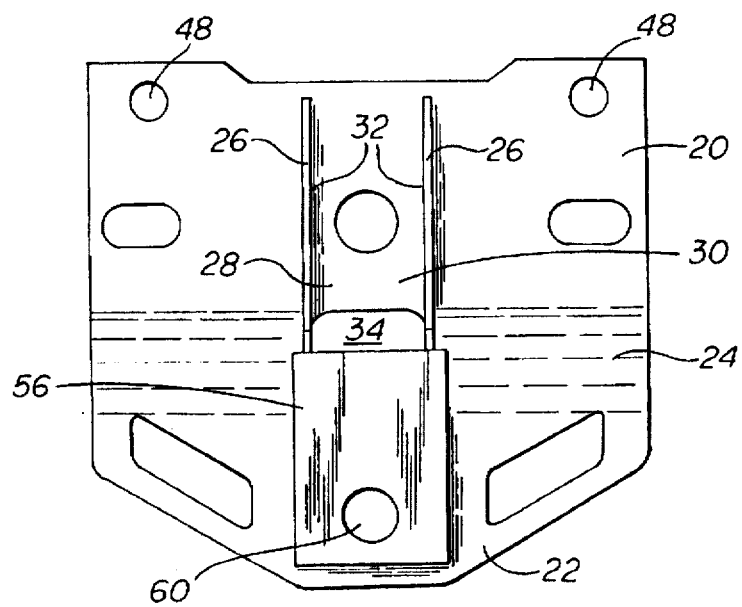
FIG. 2 is a bottom plan view of the body of the step bumper hitch.

Reference is now made to FIG. 1 showing the hitch 10 of the present invention adapted for mounting to the step bumper B of a towing vehicle (not shown). As best shown in FIGS. 1, 2 and 3b the hitch 10 comprises a body generally designated by the reference numeral 12 including a means 14 for receiving a draw bar D and a means 16 for supporting a hitch ball 18. More specifically, the body 12 includes a mounting skirt 20, a hitch ball support platform 22 and a facing 24 joining the mounting skirt and hitch ball support platform. Preferably, the mounting skirt 20, hitch ball support platform 22 and facing 24 are formed as a single integral piece by cold forging from a coil or blank of construction material, preferably steel.

As best shown in FIG. 3, the means 14 for receiving a draw bar includes first and second laterally spaced reinforcing elements 26 that are connected (e.g. by welding) to the reverse faces of the mounting skirt 20 and facing 24. Thus, it should be appreciated that a receiver box 28 is defined between the underside 30 of the mounting skirt 20 and the inwardly directed, opposed faces 32 of the reinforcing elements 26. An opening 34 in the facing 24 communicates with the receiver box 28. Preferably, the opening 34 is sized so as to be slightly greater than 2 inches tall by 2 inches wide thereby allowing receipt of a 2 inch by 2 inch draw bar D.

In accordance with a further aspect of the present invention, the hitch 10 also includes a means 36 for securing the draw bar D in the receiver box 28. More specifically, the securing means 36 includes a pair of aligned apertures 38; one in each of the first and second reinforcing elements 26. Additionally, a connecting pin 40 is provided for extending through the aligned apertures 38 and a cooperating aligned aperture A in the draw bar D (see FIG. 3b). As is known in the art, the connecting pin preferably includes a groove 42 adjacent its distal end. A spring pin clip 44 is engaged in this groove 42 to secure the connecting pin 40 in position in a manner well known in the art.

The hitch 10 also includes a means 46 for mounting the body to or on a step bumper B. More specifically, spaced mounting apertures 48 are provided in the mounting skirt 20 and fastening means, such as bolts 50, are extended through the spaced mounting apertures and cooperating aligned mounting holes H in the step bumper B. Cooperating nuts 52 are then tightened on the bolts 50. Lockwashers 54 secure the connection.

In order to provide still greater structural integrity, it should also be appreciated that a reinforcing plate 56 may be connected as, for example, by welding between the first and second reinforcing elements 26 and the hitch ball support platform 22. Thus, the reinforcing plate 56 effectively forms a bottom wall of the hitch 10, functioning as a skid plate under certain operating conditions.

In operation, the hitch 10 provides a number of distinct advantages over a standard step bumper towing connection. Specifically, as shown in full line in FIG. 3a, a hitch ball 18 may be secured to the hitch ball support platform 22. More specifically, the threaded shank 58 of the hitch ball 18 is extended through a cooperating aperture 60 in the platform 22. A nut 62 and cooperating lock washer 64 are utilized to secure the hitch ball 18 in position.

Figure 3A:
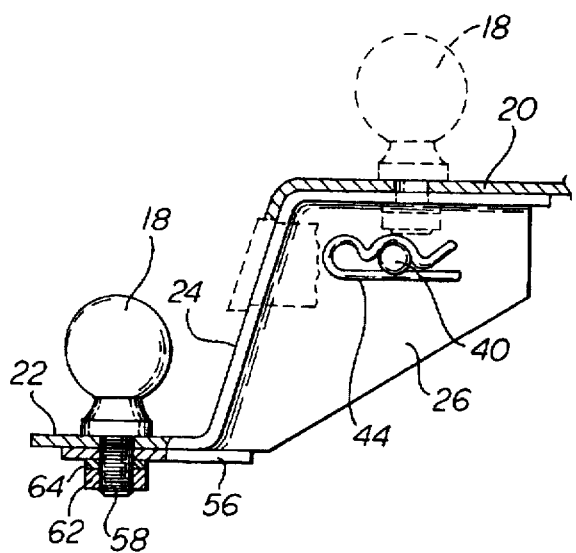
FIG. 3a is a side elevational view of the step bumper hitch showing in full line the hitch ball in position for towing on the hitch ball support plate and in phantom line the hitch ball in position for towing on the step bumper.
Figure 3B:
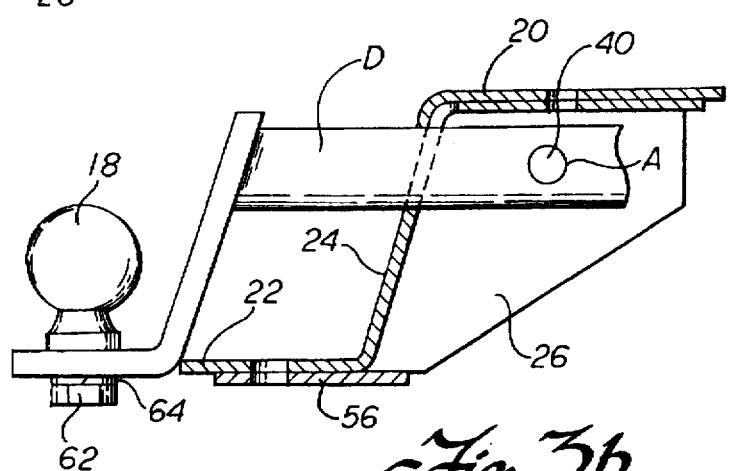
FIG. 3b is a view similar to FIG. 3a but showing the hitch ball mounted on a draw bar secured in position in the integral receiver box of the step bumper hitch.

Alternatively, the hitch ball 18 may be mounted in the standard position on the step bumper B as shown in phantom line in FIG. 3a. More specifically, the shank 58 of the hitch ball 18 is extended through the standard opening P in the bumper B and an additional aligned cooperating opening 66 in the mounting skirt 20. The nut 62 and lock washer 64 are again utilized to secure the hitch ball in position.

As should be appreciated, the ability to position the hitch ball 18 in the standard step bumper position shown in phantom line or on the support platform 22 shown in full line allows the vehicle operator to adjust the relative height of the hitch ball with respect to the ground. Accordingly, towing height may be adjusted as necessary to allow the towing of a variety of vehicles. This is not possible with a standard step bumper B alone.

As further shown in FIG. 3b, the hitch ball 18 may be removed from the positions shown in FIG. 3a thereby providing the necessary clearance to allow a draw bar D to be inserted into the receiver box 28 through the opening 34 in the facing 24. More specifically, the draw bar D is inserted until the connecting pin receiving aperture A in the draw bar is aligned with the apertures 38 in the reinforcing elements 26. The connecting pin 40 is then inserted through the aligned apertures 26 and connecting pin receiving aperture A in the draw bar D and secured in position with the spring pin clip 44. Thus, the step bumper hitch 10 also securely receives a draw bar D with hitch ball 18 that may assume a number of shapes and configurations thereby providing still greater height adjustability and/or the convenient and ready connection of various attachments such as bike racks, utility racks, cranes and cargo boxes of a nature well known in the art. Hence, it should be appreciated that the step bumper hitch 10 of the present invention significantly enhances the towing versatility of an ordinary step bumper equipped vehicle. Further, this is achieved by means of a simple and inexpensive structure that may be readily and conveniently connected to the step bumper even without professional assistance. As a result, the step bumper hitch 10 of the present invention is expected to be very popular with the consuming public and particularly those individuals who are concerned about the additional expense that would be incurred by installing a full state of the art hitch receiver.

In summary, numerous benefits are achieved by the use of the step bumper hitch 10 of the present invention. As pointed out, towing versatility and performance are significantly enhanced. By means of a simple installation of the relatively small and light weight hitch 10, a vehicle equipped with a step bumper may be modified to allow hitch ball height adjustability and the ready receipt of a draw bar for towing or carrying integral utility attachments. Thus, the present invention represents a significant advance over state of the art hitch designs.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A step bumper hitch, comprising:
   a body including a facing, a means for receiving a draw bar in said facing and a means for supporting a hitch ball;
   means for mounting said body to a step bumper of a vehicle; and
   means for securing said draw bar in said body.

2. A step bumper hitch, comprising:
   a body including a mounting skirt, a hitch ball support platform, a facing joining said mounting skirt and said hitch ball support platform, a means for receiving a draw bar and a means for supporting a hitch ball;
   means for mounting said body to a step bumper of a vehicle; and
   means for securing said draw bar in said body.

3. The step bumper hitch set forth in claim 2, wherein said means for receiving a draw bar includes (a) first and second laterally spaced reinforcing elements connected to reverse faces of said mounting skirt and facing so as to define a receiver box between said mounting skirt and said first and second reinforcing elements and (b) an aperture in said facing in communication with said receiver box.

4. The step bumper hitch set forth in claim 3, wherein said means for securing said draw bar includes (a) a pair of aligned apertures, one in each of said first and second reinforcing elements; (b) a connecting pin for extending through said aligned apertures in said first and second reinforcing elements and a cooperating aperture in said drawbar; and (3) a pin clip for engaging and securing said connecting pin in position.

5. The step bumper hitch set forth in claim 4, further including a reinforcing plate connected between said first and second reinforcing elements and said hitch ball support platform.

6. The step bumper hitch set forth in claim 5, further including a hitch ball mounted to said hitch ball support plate.

7. The step bumper hitch set forth in claim 5, wherein said means for mounting said body includes spaced mounting apertures in said mounting skirt and fastening means for extending through said spaced mounting apertures and cooperating aligned mounting holes in said step bumper.

8. The step bumper hitch set forth in claim 7, further including a hitch ball mounting aperture in said mounting skirt that is aligned with a hitch ball mounting aperture in said step bumper.

9. The step bumper hitch set forth in claim 3, further including a reinforcing plate connected between said first and second reinforcing elements and said hitch ball support platform.

10. The step bumper hitch set forth in claim 9, further including a hitch ball mounted to said hitch ball support plate.

11. The step bumper hitch set forth in claim 9, wherein said means for mounting said body includes spaced mounting apertures in said mounting skirt and fastening means for extending through said spaced mounting apertures and cooperating aligned mounting holes in said step bumper.

12. The step bumper hitch set forth in claim 11, further including a hitch ball mounting aperture in said mounting skirt that is aligned with a hitch ball mounting aperture in said step bumper.

13. The step bumper hitch set forth in claim 2, further including a hitch ball mounted to said hitch ball support plate.

14. The step bumper hitch set forth in claim 2, wherein said means for mounting said body includes spaced mounting apertures in said mounting skirt and fastening means for extending through said spaced mounting apertures and cooperating aligned mounting holes in said step bumper.

15. The step bumper hitch set forth in claim 14, further including a hitch ball mounting aperture in said mounting skirt that is aligned with a hitch ball mounting aperture in said step bumper.

16. The step bumper hitch set forth in claim 2, further including a hitch ball mounting aperture in said mounting skirt that is aligned with a hitch ball mounting aperture in said step bumper.

17. The step bumper hitch set forth in claim 2, wherein said mounting skirt, hitch ball support platform and facing are of integral, one-piece construction.

18. A step bumper hitch, comprising:
   a body including a mounting skirt with depending facing and means for receiving a drawbar in said facing;
   means for mounting said body to a step bumper of a vehicle; and
   means for securing said draw bar in said body.

19. A step bumper hitch comprising:

a body including a mounting skirt with depending facing and means for receiving a drawbar, said means for receiving said drawbar including (a) first and second laterally spaced reinforcing elements connected to reverse faces of said mounting skirt and facing so as to define a receiver box between said mounting skirt and said first and second reinforcing elements and (b) an aperture in said facing in communication with said receiver box;

means for mounting said body to a step bumper of a vehicle; and means for securing said drawbar in said body.

20. The step bumper hitch set forth in claim 19, wherein said means for securing said draw bar includes (a) a pair of aligned apertures, one in each of said first and second reinforcing elements; (b) a connecting pin for extending through said aligned apertures in said first and second reinforcing elements and a cooperating aperture in said drawbar; and (3) a pin clip for engaging and securing said connecting pin in position.

21. The step bumper hitch set forth in claim 20, wherein said means for mounting said body includes spaced mounting apertures in said mounting skirt and fastening means for extending through said spaced mounting apertures and cooperating aligned mounting holes in said step bumper.

22. The step bumper hitch set forth in claim 21, further including a hitch ball mounting aperture in said mounting skirt that is aligned with a hitch ball mounting aperture in said step bumper.

23. A step bumper hitch, comprising:

a body including a mounting skirt with depending facing and means for receiving a drawbar;

means for mounting said body to a step bumper of a vehicle including spaced mounting apertures in said mounting skirt and fastening means for extending through said spaced mounting apertures and cooperating aligned mounting holes in said step bumper; and means for receiving said drawbar in said body.

24. A step bumper hitch, comprising:

a body including a mounting skirt with depending facing and means for receiving a drawbar;

means for mounting said body to a step bumper of a vehicle;

means for securing said draw bar in said body; and a hitch ball mounting aperture in said mounting skirt that is aligned with a hitch ball mounting aperture in said step bumper.

* * * * *